Figure 2:
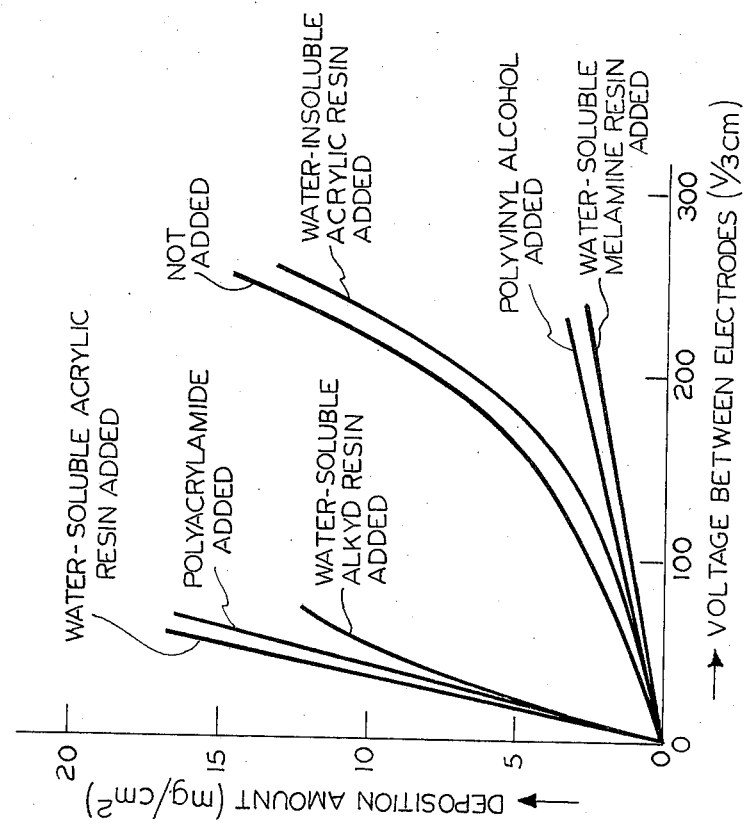

United States Patent
Koizumi et al.

[11] 3,886,103
[45] May 27, 1975

[54] METHOD FOR COATING METAL SUBSTRATE WITH A COMPOSITION CONTAINING VINYLIDENE FLUORIDE POLYMER OR VINYL FLUORIDE POLYMER

[75] Inventors: Shun Koizumi, Toyonaka; Takeshi Suzuki, Kyoto; Chuzo Okuno, Takatshki, all of Japan

[73] Assignee: Daikin Kogyo Co. Ltd., Japan

[22] Filed: Sept. 11, 1973

[21] Appl. No.: 396,307

Related U.S. Application Data

[63] Continuation of Ser. No. 126,062, March 19, 1971, abandoned.

[30] Foreign Application Priority Data

Mar. 19, 1970  Japan.............................. 45-023979

[52] U.S. Cl. ... 260/22 CB; 117/132 CF; 117/161 K; 117/161 UZ; 204/181; 260/29.2 UA; 260/29.6 F
[51] Int. Cl. .......................... C09d 3/78; C09d 5/24
[58] Field of Search ... 260/22 CB, 29.6 F, 29.2 UA; 204/181

[56] References Cited
UNITED STATES PATENTS

| | | | |
|---|---|---|---|
| 2,681,324 | 6/1954 | Hochberg | 260/29.6 F |
| 2,820,752 | 1/1958 | Heller | 204/181 |
| 3,169,120 | 2/1965 | Capron et al. | 260/29.6 F |
| 3,486,930 | 12/1969 | Antlfinger et al. | 260/22 CB |
| 3,531,390 | 9/1970 | LeBras | 204/181 |
| 3,622,473 | 11/1971 | Ohta et al. | 204/181 |
| 3,635,809 | 1/1972 | Seki et al. | 204/181 |

FOREIGN PATENTS OR APPLICATIONS 1,941,499  2/1970  Germany .................. 260/29.6 F

*Primary Examiner*—Ronald W. Griffin
*Attorney, Agent, or Firm*—Wenderoth, Lind & Ponack

[57] ABSTRACT

A method for coating a metal substrate which comprises immersing the substrate in a coating composition comprising a vinylidene fluoride polymer or a vinyl fluoride polymer powder having a particle size of 0.01 to 100 microns, a mixture of an organic solvent system to form a film of the said polymer and water in a ratio of from 20:80 to 90:10 by weight and a water-soluble resin dissociating in water in an amount of 0.1 to 30 percent by weight to the said polymer and passing a direct electric current between the substrate to be coated as the anode and another material as the cathode in contact with the said coating composition.

13 Claims, 2 Drawing Figures

INVENTORS
SHUN KOIZUMI
TAKESHI SUZUKI
CHUZO OKUNO

METHOD FOR COATING METAL SUBSTRATE WITH A COMPOSITION CONTAINING VINYLIDENE FLUORIDE POLYMER OR VINYL FLUORIDE POLYMER

This is a continuation of application Ser. No. 126,062, filed Mar. 19, 1971, now abandoned.

The present invention relates to a method for coating a metal substrate with a composition containing a vinylidene fluoride polymer or a vinyl fluoride polymer.

As a coating composition comprising a fluorine-containing polymer as its main constituent, there has been known one in which a fluorine-containing polymer is dissolved or dispersed in a solvent which imports a specific crystalline melting poing to the polymer (cf. Japanese Pat. Publication No. 4176/1963). For coating with the said composition, a conventional application procedure such as painting, dipping, roller coating or spraying has been employed, and baking has been performed at a temperature higher than about 200°C. However, the thickness of the resulting film can be hardly controlled, and it is difficult to form a uniform film, particularly in the case of small articles having complicated shapes such as machine parts. Further, in the known coating method, it is difficult to automate the coating operation, and, even if done, various disadvantages occur such as considerable loss of the coating composition during this procedure. Moreover, since the used solvent is scattered and easily catches fire, some danger is unavoidable in carrying out this method.

As the result of extensive studies, it has now been found that the said drawbacks in the known coating method can be overcome by electrodepositing the novel coating composition of the present invention compromising a vinylidene fluoride polymer or a vinyl fluoride polymer.

In accordance with the present invention, there is provided a method for coating the surface of a metal substrate which comprises immersing the substrate in a coating composition comprising a vinylidene fluoride polymer or a vinyl fluoride polymer powder having a particle size of 0.01 to 100 $\mu$, a mixture of an organic solvent system capable of forming a film of the said polymer and water in a ratio of from 20 : 80 to 90 : 10 by weight and a water-soluble resin which dissociates in water in an amount of 0.1 to 30 percent by weight to the said polymer and passing a direct electric current between the substrate to be coated as the anode and another material in contact with the said coating composition as the cathode.

According to the present invention, there is very little loss of coating composition as in the known method where a coating composition comprising a fluorine-containing polymer is used, and the almost entire composition supplied in the coating process participates in the formation of a film. The coating operation of the present invention also can be conducted with safety, because there is no scattering of the solvent. Further, the thickness of the film to be formed can be optionally controlled by varying the passing amount of direct electric current and a uniform film can be formed over the whole surface of the substrate material to be coated, irrespective of complication of the shape. In addition, the coating process can be automatically and continuously carried out with ease.

The terms "vinylidene fluoride polymer" and "vinyl fluoride polymer" herein used are intended to mean of vinylidene fluoride or vinyl fluoride and copolymers of vinylidene fluoride or vinyl fluoride with any other polymerizable monomers including not less then 75 percent by weight, especially 90 percent by weight or more, of vinylidene fluoride or vinyl fluoride units, inclusively. Examples of the monomer to be copolymerized with vinylidene fluoride or vinyl fluoride are ethylene, propylene, isobutylene, styrene, vinyl chloride, vinylidene chloride, difluorochloroethylene. trifluorochloroethylene, tetrafluoroethylene, trifluoropropylene, hexafluoropropylene, vinyl formate, vinyl acetate, vinyl propionate, vinyl butyrate, acrylic acid and its salts, methyl methacrylate, allyl methacrylate, acrylonitrile, N-butylmethacrylic amide, allyl acetate, isopropenyl acetate, etc. The vinylidene fluoride polymer or the vinyl fluoride polymer is used in the form of powder having a particle size of 0.01 to 100 $\mu$, preferably 0.1 to 20 $\mu$. The concentration of the vinylidene fluoride polymer or the vinyl fluoride polymer in the coating composition may be from 1 to 30 percent by weight, preferably from 5 to 15 percent by weight.

The organic solvent system used to form a film of the vinylidene fluoride polymer or the vinyl fluoride polymer is one which can dissolve the said polymer at room temperature or at a temperature lower than its boiling point. Such solvent system may be consitituted with a sole organic solvent or a mixture of two or more organic solvents. Examples of the solvent which can be used alone are dimethylformamide, diethylformamide, dimethylacetamide, 2-pyrrolidone, N-methyl-2-pyrrolidone, $\gamma$-butyrolactone, ethylene glycol monobutylether, diethylene glycol monomethyleter, diethylene glycol monoethylether, diethylene glycol diethylether, diethylene glycol monoethylether acetate, diethylene glycol monobutylether, triethylene glycol monomethylether, etc. These solvents are soluble in water and may be used alone or in combination. Among them, ethylene glycol monobutylether, diethylene glycol monoethylether, diethylene glycol monoethylether acetate and diethylene glycol monobutylether are preferable. Examples of the solvents which can be used in combination with the said solvent but not alone are dimethyl adipate, dioctyl adipate, dimethyl sabacate, isophorone, dimethyl phthalate, diethyl phthalate, dibutyl phthalate, quinoline, ethylene glycol monophenyleter, ethylene glycol monophenyleter acetate, diethylene glycol monobutylether acetate, diethylene glycol dibutyl ether, propylene glycol monobutylether, etc. These solvents are insoluble in water, and one or more of them are admixed, so as to make soluble in water, with one or more of the said solvents which can be used alone or organic solvents which are soluble in water and do not dissolve the said polymers (e.g., butyl alcohol, aminoalcohol). Then, on preparation of the coating composition, a mixture of the organic solvent system and water in a ratio of from 20 : 80 to 90 : 10 weight is used in dispersing the vinylidene fluoride polymer or the vinyl fluoride polymer.

As the water-soluble resin which is used as the constituent in the coating composition, there may be employed one having a high molecular weight and is ionized in water, such as a water-soluble acrylic acid resin, a water-soluble alkyd resin or an acrylic amide resin. Examples of the water-soluble acrylic acid resin are the water-soluble salts of a copolymer containing a free acid residue such as the water-soluble ammonium salt of a copolymer of acrylic acid or methacrylic acid with an alkyl ester of an α,β-ethylenically unsaturated monocarboxylic acid (e.g. methyl acrylate, ethyl acrylate, methyl crotonate) or the water-soluble salt of a sulfonated copolymer of a lower alkyl ester of acrylic acid or methacrylic acid with vinylic toluene, a copolymer containing an acrylamide or methacrylamide, or its methylol compound such as the methylol derivative of a copolymer of an unsaturated carboxylic acid amide (e.g., acrylamide, methacrylamide) with N-vinyl lactam or a copolymer of N-methylolacrylic amide (less than 40 percent by weight) with ethyl acrylate, etc. As the water-soluble alkyd resin, there may be employed one which is rendered water-soluble by the existence of a polyfunctional acid unit therein. Such water-soluble resin may be used in an amount of 0.1 to 30 percent by weight, preferably 1 to 10 percent by weight of the said polymer. The addition of a water-soluble resin in the coating composition prevents peeling or running of the formed film before baking. When the resin is not incorporated, the formed film is soft and not firmly adhered to the surface of the substrate material so that, on withdrawing from the coating bath, it will be peeled off.

For the preparation of the coating composition from the above mentioned components, the vinylidene fluoride polymer or the vinyl fluoride polymer may be first dispersed in a mixture of the organic solvent and water and then the water-soluble resin added thereto. Alternatively, the polymer may be added to water, the organic admixed therewith and then the water-soluble resin incorporated therein.

In the coating composition, a surface active agent may be incorporated as a dispersion-promoting agent, if necessary. As the surface active agent, there may be employed an anionic agent such as alkylbenzenesulfonate, alkylnaphthalenesulfonate or dialkylsulfonesuccinate.

For the purpose of coloring the metal substrate, an appropriate pigment such as titanium oxide, carbon black, cyanine green, cyanine blue, cadmium red, cadmium yellow or rouge may be incorporated in the coating composition.

The electro-deposition coating may be effected in a per se conventional manner, i.e., a constant voltage method or a constant current method. In either method, a direct electric current is passed between the metal substrate to be coated as the anode and another material as a cathode. The voltage in the constant voltage method depends on the distance between the electrodes and may be usually 10 to 300 volts/cm. In general, as the voltage is raised, the deposition rate of the coating composition is increased. But too high voltage is not desirable, because it results in drastic electroylsis of the water. The temperature of the coating composition is not particularly limited, but a temperature around room temperature, e.g., about 25°C, is preferable for easy control of the temperature. The thickness of the film can be optionally controlled by varying the electric current, the voltage and the deposition time, because it is increased in proportion to the increase in these parameters.

After the formation of coating is completed, baking is performed. For instance, the coated metal substrate is dried at a temperature lower than the boiling point of water, i.e., about 85° to 95°C, so as to prevent the formation of cracks or bubbles on the film due to the boiling of the water present in the film. Then, the dried material is heated at 150° to 300°C for elimination of the organic solvent from the film and coalescence of the resin in the film. In the case that only the elimination of the organic solvent is desired, the material is preferably heated at as a high temperature as far possible within the boiling point of the organic solvent, i.e., about 180° to 280°C. At a temperature higher than the boiling point of the oranic solvent, cracks or bubbles are formed on the film due to the boiling of the organic solvent. When a mixture of two solvents whose boiling points are considerably different than each other is employed, heating should be carried out first at a temperature lower than the boiling point of the solvent having the lower boiling point, and then at a temperature lower than the boiling point of the solvent having the higher boiling point. If the boiling point is lower than that of water, its elimination is performed before eliminating water.

Some test results carried out according to the present invention will be hereinafter illustrated in reference to the accompanying drawings.

Test 1

This test was carried out using a polyvinylidene fluoride dispersion without any water-soluble resin for establishing the relationship between the amount of electrodeposition and the water content in the liquid medium.

1. Polyvinylidene fluoride dispersion

| | | |
|---|---|---|
| Polyvinylidene fluoride polymer (Intrinsic viscosity, 1.58. Particle size, 0.33 micron) | | 10 % by weight |
| Liquid medium | | 90 % by weight |
| Butylcarbitol | 100 to 20 % by weight | |
| Water | 0 to 80 % by weight | |

2. Conditions of electrodeposition

The constant voltage method was adopted. Voltage: 25 to 250 volts. Electrodeposition time: 2 minutes. Metal substrate: galvanized steep plate. Bath temperature: 25°C. Area ratio of the substrate and the cathode: 1 : 1. Distance between the electrodes: 3 cm.

3. Drying and Baking conditions

After drying at 95°C for 10 minutes, baking was effected at 220°C for 10 minutes.

4. Results

Figure 1:
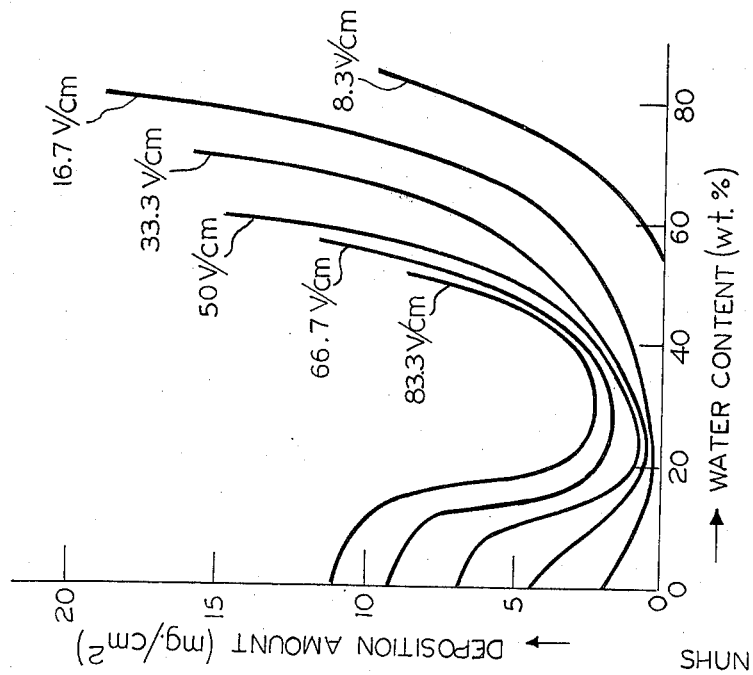

The results are shown in FIG. 1 of the accompanying drawings, from which it is understood that the amount of electro-deposition is markedly decreased around a water content of 20 to 40 percent by weight. When the water content is higher than 50 percent by weight, the electro-deposition amount is increased but, in case of using no water-soluble resin, the resulting film is not firmly adhered on the substrate material and is peeled off on withdrawing the coated article from the bath.

Test 2

The test was carried out using various coating compositions containing polyvinylidene fluoride with or without a water-soluble resin for establishing the relationship between the amount of electro-deposition and the voltage between the electrodes.

1. Coating composition

| | |
|---|---|
| Polyvinylidene fluoride polymer (Intrinsic viscosity, 1.58. Particle size, 0.33 micron) | 10 % by weight |
| Liquid medium | 90 % by weight |
|   Butylcarbitol    40 % by weight | |
|   Dimethyl phthalate  10 % by weight | |
|   Water    50 % by weight | |

To the above composition, one of the following resins is added or not and when added is incorporated in an amount of 5 % by weight of the weight of the polyvinylidene fluoride: a water-soluble acryl resin, a polyacrylamide, a water-soluble alkyd resin, a water-insoluble acryl resin, a polyvinly alcohol, and a water-soluble melamine resin

2. Conditions of electrodeposition

The constant voltage method was adopted. Voltage: 25 to 250 volts. Electrodeposition time: 2 minutes. Metal substrate galvanized steel plate. Bath temperature: 25°C. Area ratio of the substrate and the cathode: 1 : 1. Distance between the electrodes: 3 cm.

3. Drying and baking condition

After drying at 95°C for 10 minutes, baking was effected at 250°C for 10 minutes.

4. Results

The results are shown in FIG. 2 of the accompanying drawings, from which it is understood that the amount of electro-deposition is much increased in the compositions containing a water-soluble and ionizable resin than when no resin is incorporated therein. It is also understood that the incorporation of a water-insoluble resin rather produces the adverse effect. When the resin is soluble but non-ionizable (i.e., polyvinyl alcohol, water-soluble melamine resin), the amount of electro-deposition is extremely small.

For a better understanding of the present invention, the practical and presently preferred embodiments are shown in the following Examples together with the corresponding Control Examples. In these Examples and Control Examples, parts and percent are by weight.

EXAMPLE 1

A mixture of polyvinylidene fluoride powder (particle size: 0.33 micron) (48 parts) and diethylene glycol monobutyl ether (B.P. 230°C) (72 parts) is pulverized in a ball mill for 24 hours to give a 40 percent (solid concentration) dispersion of polyvinylidene fluoride. This dispersion (120 parts) is combined with diethylene glycol monobutyl ether (273.6 parts) and ion exchange resin-treated water (86.4 parts) to give a 10 percent (solid concentration) dispersion of polyvinylidene fluoride. The dispersion (480 parts) is admixed with an aqueous solution of a water-soluble thermosetting acrylic resin "Honnylite H-1000" (solid concentration, 35 percent; manufactured by Honny Chemicals Co., Ltd.)(6.9 parts; corresponding to about 5 percent of acrylic resin for polyvinylidene fluoride) to give a 10 percent (solid concentration) dispersion of polyvinylidene fluoride containing a water-soluble thermosetting acrylic resin.

In the resulting dispersion, there is dipped a galvanized steel plate (0.5 mm thick)(the surface being coated with crystalline zinc phosphate; manufactured by Nippon Test Pannel Co., Ltd.) which is connected with an anode of the direct current source, and as the cathode an insoluble metal plate is dipped therein in such a manner that there is 3 cm distance between both electrodes. Electro-deposition is effected by applying 50, 100 and 200 volts of direct current at 25°C for 2 minutes. The deposited plate is dried at 95°C for 10 minutes and baked at 220°C for 10 minutes.

The appearance of the coating film and the amount of electro-deposition are shown in Table 1, Column A.

Control Example 1

Using a 10 percent (solid concentration) dispersion of polyvinylidene fluoride as in Example 1 but without a water-soluble thermosetting acrylic resin, electro-deposition is effected by applying 50, 100, 200 and 300 volts of direct current.

The appearance of the coating film and the amount of electro-deposition are shown in Table 1, Column B.

Table 1

| | Voltage between electrodes (V) | Initial current density (mA/cm$^2$) | State of deposition film Before baking | State of deposition film After baking | Deposition amount (mg/cm$^2$) |
|---|---|---|---|---|---|
| A | 50 | $1.60 \times 10^{-1}$ | Hard, runs not produced | Even, no crack, transparent, lustrous | 4.05 |
| A | 100 | $3.36 \times 10^{-1}$ | Hard, runs not produced | Even, no crack, transparent, lustrous | 7.13 |
| A | 200 | $6.94 \times 10^{-1}$ | Hard, runs not produced | Even, no crack, slightly turbid, lustrous | 13.2 |
| B | 50 | $1.73 \times 10^{-2}$ | Soft, runs produced | Not deposited | 0.07 |
| B | 100 | $2.96 \times 10^{-2}$ | Soft, runs produced | Even, no crack, transparent, lustrous | 0.41 |
| B | 200 | $7.04 \times 10^{-2}$ | Soft, runs produced | Even, no crack, transparent, lustrous | 1.89 |
| B | 300 | $11.01 \times 10^{-2}$ | Soft, runs produced | Even, no crack, transparent, lustrous | 4.20 |

EXAMPLE 2

A 10 percent dispersion of polyvinylidene fluoride containing a water-soluble thermosetting acrylic resin is prepared as in Example 1 but using 187.2 parts of diethylene glycol monobutyl ether in place of 273.6 parts of the same and 172.8 parts of water in place of 86.4 parts of the same.

In the same manner as in Example 1, the electro-deposition is effected using the above prepared dispersion and applying 25, 50 and 100 volts of direct current.

The appearance of the coating film and the amount of electro-deposition are shown in Table 2, Column A.

Control Example 2

Using a 10 percent dispersion of polyvinylidene fluoride as in Example 2 but without a water-soluble thermosetting acrylic resin, electro-deposition is effected by applying 50, 100 and 200 volts of direct current.

The appearance of the coating film and the amount of electro-deposition are shown in Table 2, Column B.

Table 2

| Voltage between electrodes (V) | | Initial current density (mA/cm$^2$) | State of deposition film | | Deposition amount (mg/cm$^2$) |
|---|---|---|---|---|---|
| | | | Before baking | After baking | |
| A | 25 | — | Hard, runs not produced | Even, no crack, transparent, lustrous | 3.30 |
| | 50 | 3.44 × 10$^{-1}$ | Hard, runs not produced | Even, no crack, transparent, lustrous | 7.32 |
| | 100 | — | Hard, runs not produced | Even, no crack, slightly turbid, lustrous | 14.55 |
| B | 50 | 5.92 × 10$^{-2}$ | Soft, runs produced | Even, no crack, transparent, lustrous | 0.94 |
| | 100 | 1.08 × 10$^{-1}$ | Soft, runs produced | Even, no crack, transparent, lustrous | 1.85 |
| | 200 | 2.21 × 10$^{-1}$ | Soft, runs produced | Even, no crack, transparent, lustrous | 2.35 |

EXAMPLE 3

A 10 percent dispersion of polyvinylindene fluoride containing a water-soluble thermosetting acrylic resin is prepared as in Example 1 but using 100.8 parts of diethylene glycol monobutyl ether in place of 273.6 parts of the same and 259.2 parts of water in place of 86.4 parts of the same.

In the same manner as in Example 1, the electrodeposition is effected using the above prepared dispersion and applying 15, 25 and 50 volts of direct current.

The appearance of the coating film and the amount of electro-deposition are shown in Table 3, Column A.

Control Example 3

Using a 10 percent dispersion of polyvinylidene fluoride as in Example 3 but without a water-soluble thermosetting acrylic resin, electro-deposition is effected by applying 25, 50 and 100 volts of direct current.

The appearance of the coating film and the amount of electro-deposition are shown in Table 3, Column B.

Table 3

| Voltage between electrodes (V) | | Initial current density (mA/cm$^2$) | State of deposition film | | Deposition amount (mg/cm$^2$) |
|---|---|---|---|---|---|
| | | | Before baking | After baking | |
| A | 15 | — | Hard, runs not produced | Even, no crack, slightly cloudy, lustrous | 5.12 |
| | 25 | 3.1 × 10$^{-1}$ | Hard, runs not produced | Even, no crack, slightly cloudy, lustrous | 7.58 |
| | 50 | 6.0 × 10$^{-1}$ | Hard, runs not produced | Even, no crack, slightly turbid, lustrous | 15.20 |
| B | 25 | — | Soft, runs produced | Even, no crack, transparent, lustrous | 0.65 |
| | 50 | 1.48 × 10$^{-1}$ | Soft, runs produced | Even, no crack, transparent, lustrous | 3.55 |
| | 100 | 2.48 × 10$^{-1}$ | Soft, runs produced | Even, no crack, transparent, lustrous | 6.41 |

EXAMPLE 4

A mixture of polyvinylidene fluoride powder (particle size: 0.54 micron)(48 parts) and diethylene glycol monobutyl ether (72 parts) is pulverized in a ball mill for 24 hours to give a 40 percent (solid concentration) dispersion of polyvinylidene fluoride. This dispersion (120 parts) is combined with diethylene glycol monobutyl ether (86 parts), triethylene glycol (67.2 parts) and ion exchange resin-treated water (292.8 parts) to give a 10 percent (solid concentration) dispersion of polyvinylidene fluoride. The dispersion (566 parts) is admixed with an aqueous solution of a water-soluble thermo-setting acrylic resin "Honnylite H-1000" (6.9 parts) to give a 10 percent (solid concentration) dispersion of polyvinylidene fluoride containing a water-soluble thermosetting acrylic resin.

In the resulting dispersion, there is dipped a galvanized steel plate (0.5 mm thick) which is connected with an anode of the direct current source, and as the cathode an insoluble metal plate is dipped therein in such a manner that there is 3 cm distance between both electrodes. Electro-deposition is effected by applying 25, 50 and 100 volts of direct current at 25°C for 2 minutes. The deposited plate is dried at 95°C for 10 minutes and baked at 250°C for 10 minutes.

The appearance of the coating film and the amount of electro-deposition are shown in Table 4, Column A.

Control Example 4

Using a 10 percent (solid concentration) dispersion of polyvinylidene fluoride as in Example 4 but without a water-soluble thermosetting acrylic resin, electro-deposition is effected by passing 50, 100 and 150 volts of direct current.

The appearance of the coating film and the amount of electro-deposition are shown in Table 4, Column B.

Table 4

| Voltage between electrodes (V) | | State of deposition film | | Deposition amount (mg/cm$^2$) |
|---|---|---|---|---|
| | | Before baking | After baking | |
| A | 25 | Hard, runs not produced | Even, no crack, transparent, lustrous | 4.47 |
| | 50 | Hard, runs not produced | Even, no crack, transparent, lustrous | 7.61 |
| | 100 | Hard, runs not produced | Even, no crack, slightly turbid, lustrous | 14.55 |
| B | 50 | Not deposited | Not deposited | 0 |
| | 100 | Soft, runs produced | Even, no crack, transparent, lustrous | 2.66 |
| | 150 | Soft, runs produced | Even, no crack, transparent, lustrous | 3.32 |

EXAMPLE 5

A mixture of polyvinylidene fluoride powder (particle size: 0.43 micron)(48 parts) and diethylene glycol monoethyl ether acetate (72 parts) is pulverized in a ball mill for 16 hours to give a 40 percent (solid concentration) dispersion of polyvinylidene fluoride. This dispersion (120 parts) is combined with diethylene glycol monoethyl ether acetate (100.8 parts), dimethyl phthalate (43.2 parts) and an ion exchange resin-treated water (216 parts) to give a 10 percent (solid concentration) dispersion of polyvinylidene fluoride. The dispersion (480 parts) is admixed with an aqueous solution of a water-soluble acrylic resin "Kogam HW-12" (solid concentration, 50 percent; manufactured by High Polymer Chemical Ind., Ltd.)(4.8 parts) to give a 10 percent (solid concentration) dispersion of polyvinylidene fluoride containing water-soluble acrylic resin.

In the resulting dispersion, there is dipped a galvanized steel plate (0.5 mm thick) which is connected with an anode of the direct current source, and as the cathode an insoluble metal plate is dipped therein in such a manner that there is 3 cm distance between both electrodes. Electro-deposition is effected by applying 25 and 50 volts of direct current at 25°C for 2 minutes. The deposited plate is dried at 95°C for 10 minutes and baked at 250°C for 15 minutes.

The appearance of the coating film and the amount of electro-deposition are shown in Table 5, Column A.

Control Example 5

Using a 10 percent (solid concentration) dispersion of polyvinylidene fluoride as in Example 5 but without a water-soluble acrylic resin, electro-deposition is effected by applying 50, 150 and 200 volts of direct current.

The appearance of the coating film and the amount of electro-deposition are shown in Table 5, Column B.

Table 5

| | Voltage between electrodes (V) | State of deposition film | | Deposition amount (mg/cm²) |
|---|---|---|---|---|
| | | Before baking | After baking | |
| A | 25 | Hard, runs not produced | Even, no crack, transparent, lustrous | 6.60 |
| | 50 | Hard, runs not produced | Even, no crack, transparent, lustrous | 14.15 |
| B | 50 | Soft, runs produced | Even, no crack, transparent, lustrous | 1.17 |
| | 150 | Soft, runs produced | Even, no crack, transparent, lustrous | 4.20 |
| | 200 | Soft, runs produced | Even, no crack, transparent, lustrous | 12.02 |

EXAMPLE 6

A mixture of polyvinylidene fluoride powder (particle size: 1 to 20 microns)(48 parts) and ethylene glycol monobutyl ether (72 parts) is pulverized in a ball mill for 16 hours to give a 40 percent (solid concentration) dispersion of polyvinylidene fluoride. This dispersion (120 parts) is combined with ethylene glycol monobutyl ether (79.2 parts), diethylene glycol dibutyl ether (44.8 parts), dibutyl phthalate (20 parts) and an ion exchange resin-treated water (216 parts) to give a 10 percent (solid concentration) dispersion of polyvinylidene fluoride. The dispersion (480 parts) is admixed with an aqueous solution of a reactive type water-soluble acrylic resin "Aron S-4002" (solid concentration, 50 percent; manufactured by Toagosei Chemical Industry Co., Ltd.)(4.8 parts) to give a 10 percent (solid concentration) dispersion of polyvinylidene fluoride containing a reactive type water-soluble acrylic resin.

In the resulting dispersion, there is dipped a galvanized steel plate (0.5 mm thick) which is connected with an anode of the direct current source, and as the cathode an insoluble metal plate is dipped therein in such a manner that there is 3 cm distance between both electrodes. Electro-deposition is effected by passing 25 and 100 volts of direct current at 25°C for 2 minutes. The deposited plate is dried at 95°C for 10 minutes and at 160°C for 10 minutes and baked at 250°C for 10 minutes.

The appearance of the coating film and the amount of electro-deposition are shown in Table 6, Column A.

Control Example 6

Using a 10 percent (solid concentration) dispersion of polyvinylidene fluoride as in Example 6 but without a reactive type water-soluble acrylic resin, electro-deposition is effected by passing 100, 150 and 250 volts of direct current.

The appearance of the coating film and the amount of electro-deposition are shown in Table 6, Column B.

Table 6

| | Voltage between electrodes (V) | State of deposition film | | Deposition amount (mg/cm²) |
|---|---|---|---|---|
| | | Before baking | After baking | |
| A | 25 | Hard, runs not produced | Even, no crack, transparent, lustrous | 3.87 |
| | 100 | Hard, runs not produced | Even, no crack, slightly cloudy, lustrous | 18.72 |
| B | 100 | Soft, runs produced | Even, no crack, transparent, lustrous | 6.06 |
| | 150 | Soft, runs produced | Even, no crack, transparent, lustrous | 8.79 |
| | 250 | Soft, runs produced | Even, no crack, transparent, lustrous | 17.38 |

EXAMPLE 7

1. A mixture of polyvinylidene fluoride powder (particle size: 0.48 micron)(48 parts) and diethylene glycol monobutyl ether (72 parts) is pulverized in a ball mill for 18 hours to give a 40 percent (solid concentration) dispersion of polyvinylidene fluoride. This dispersion (120 parts) is combined with diethylene glycol monobutyl ether (100.8 parts), dimethyl phthalate (43.2 parts) and an ion exchange resin-treated water (216 parts) to give a 10 percent (solid concentration) dispersion of polyvinylidene fluoride. The dispersion (480 parts) is admixed with an aqueous solution of water-soluble thermosetting acrylic resin "Honnylite H-1000" (3.2 parts) to give a 10 percent (solid concentration) dispersion of polyvinylidene fluoride containing the water-soluble thermosetting acrylic resin.

In the resulting dispersion, there is dipped a galvanized steel plate (0.5 mm thick) which is connected with an anode of the direct current source, and as the cathode an insoluble metal plate is dipped therein so as to make for a distance of 3 cm between both electrodes. Electro-deposition is effected by applying 25 and 50 volts of direct current at 25°C for 2 minutes.

The deposited plate is dried at 95°C for 10 minutes and baked at 250°C for 10 minutes.

The appearance of the coating film and the amount of electro-deposition are shown in Table 7, Column A1.

2. The 10 percent (solid concentration) dispersion of polyvinylidene fluoride (480 parts), obtained in (1) above, is admixed with an aqueous solution of a water-soluble thermosetting acrylic resin "Honnylite H-1000" (6.4 parts) to give a dispersion of polyvinylidene fluoride containing a water-soluble thermosetting acrylic resin. As in (1) above, electro-deposition is carried out with this dispersion.

The appearance of the coating film and the amount of electro-deposition are shown in Table 7, Column A2.

3. The 10 percent (solid concentration) dispersion of polyvinylidene fluoride (480 parts), obtained in (1) above, is admixed with an aqueous solution of a water-soluble alkyd resin "Haridip BK-36" (solid concentration, 50 percent; manufactured by Harima Chemical Co., Ltd.)(4.8 parts) to give a dispersion of polyvinylidene fluoride containing a water-soluble alkyd resin. As in (1) above, electro-deposition is carried out with this dispersion.

The appearance of the coating film and the amount of electro-deposition are shown in Table 7, Column A3.

4. The 10 percent (solid concentration) dispersion of polyvinylidene fluoride (480 parts), obtained in (1) above is admixed with an aqueous solution of a water-soluble alkyd resin "Haridip BK-34" (solid concentration, 50 percent; manufactured by Harima Chemical Co., Ltd.)(4.8 parts) to give a dispersion of polyvinylidene containing a water-soluble alkyd resin. As in (1) above, electro-deposition is carried out with this dispersion.

The appearance of the coating film and the amount of electro-deposition are shown in Table 7, Column A4.

5. The 10 percent (solid concentration) dispersion of polyvinylidene fluoride (480 parts), obtained in (1) above, is admixed with an aqueous solution of polyacrylamide "Milbenresin 301" (solid concentration, 10 percent; manufactured by High Polymer Chemical Ind., Ltd.)(24 parts) to give a dispersion of polyvinylidene fluoride and polyacrylamide. As in (1) above electro-deposition is carried out with this dispersion.

The appearance of the coating film and the amount of electro-deposition are shown in Table 7, Column A5.

Control Example 7

1. Using a 10 percent (solid concentration) dispersion of polyvinylidene fluoride as in Example 7 (1), but without water-soluble thermosetting acrylic resin, electro-deposition is effected by passing 100 and 250 volts of direct current.

The appearance of the coating film and the amount of electro-deposition are shown in Table 7, Column B1.

2. The 10 percent (solid concentration) dispersion of polyvinylidene fluoride (480 parts), obtained in Example 7 (1), is admixed with an emulsion of a water-insoluble acrylic resin "Yodosol 3505" (solid concentration, 50 percent; manufactured by Kanegafuchi Spinning Co., Ltd.)(4.8 parts) to give a dispersion of a polyvinylidene fluoride containing water-insoluble acrylic resin. As in (1) above, electro-deposition is carried out with this dispersion.

The appearance of the coating film and the amount of electro-deposition are shown in Table 7, Column B2.

3. The 10 percent (solid concentration) dispersion of polyvinylidene fluoride (480 parts), obtained in Example 7 (1), is admixed with a polyvinyl alcohol powder "Polisaizer 10" (manufactured by High Polymer Chemical Ind. Ltd.) (2.4 parts) to give a dispersion of polyvinylidene fluoride containing polyvinyl alcohol. As in (1) above, electro-deposition is carried out with this dispersion.

The appearance of the coating film and the amount of electro-deposition are shown in Table 7, Column B3.

4. The 10 percent (solid concentration) dispersion of polyvinylidene fluoride (480 parts), obtained in Example 7 (1), is admixed with an aqueous solution of a water-soluble melamine resin "Nikalack MW-12" (solid concentration, 70 percent; manufactured by Sanwa Chemicals Co., Ltd.) (3.4 parts) to give a dispersion of polyvinylidene fluoride containing a water-soluble melamine resin. As in (1) above, electro-deposition is carried out with this dispersion.

The appearance of the coating film and the amount of electro-deposition are shown in Table 7, Column B4.

Table 7

| | Voltage between electrodes (V) | State of deposition film Before baking | State of deposition film After baking | Deposition amount (mg/cm$^2$) |
|---|---|---|---|---|
| A1 | 25 | Dense, runs not produced | Even, no crack, transparent, lustrous | 3.05 |
|    | 50 | Dense, runs not produced | Even, no crack, transparent, lustrous | 8.09 |
| A2 | 25 | Dense, runs not produced | Even, no crack, transparent, lustrous | 6.18 |
|    | 50 | Dense, runs not produced | Even, no crack, slightly turbid, lustrous | 13.61 |
| A3 | 25 | Soft, runs produced | Even, no crack, transparent, lustrous | 5.60 |
|    | 50 | Soft, runs produced | Even, no crack, transparent, lustrous | 9.65 |
| A4 | 25 | Soft, runs produced | Even, no crack, transparent, lustrous | 5.46 |
|    | 50 | Soft, runs produced | Even, no crack, transparent, lustrous | 9.87 |
| A5 | 25 | Hard, runs not produced | Even, no crack, yellowish brown, lustrous | 6.72 |
|    | 50 | Hard, runs not produced | Even, no crack, yellowish brown, lustrous | 12.12 |
| B1 | 100 | Soft, runs produced | Even, no crack, transparent, lustrous | 1.20 |
|    | 250 | Soft, runs produced | Even, no crack, transparent, lustrous | 17.34 |
|    | 100 | Soft, runs produced | Even, no crack, transparent, lustrous | 1.00 |

Table 7-Continued

| Voltage between electrodes (V) | State of deposition film Before baking | After baking | Deposition amount (mg/cm$^2$) |
| --- | --- | --- | --- |
| B2 250 | Soft, runs produced | Even, no crack, transparent, lustrous | 14.79 |
| B3 100 | Soft, runs produced | Even, no crack, yellowish brown, lustrous | 1.58 |
| B4 100 | Soft, runs produced | Even, no crack, transparent, lustrous | 1.34 |

EXAMPLE 8

A mixture of polyvinylidene fluoride powder (particle size: 0.33 micron) (24 parts) and diethylene glycol monobutyl ether (56 parts) is pulverized in a ball mill for 18 hours to give a 30 percent (solid concentration) dispersion of polyvinylidene fluoride. This dispersion (80 parts) is combined with diethylene glycol monobutyl ether (111.5 parts), dimethyl phthalate (82.1 parts) and an ion exchange resin-treated water (182.4 parts) to give a 5.25 percent (solid concentration) dispersion of polyvinylidene fluoride. The dispersion (456 parts) is admixed with an aqueous solution of a water-soluble thermosetting acrylic resin "Honnylite H-1000" (6.9 parts) to give a dispersion of polyvinylidene fluoride containing a water-soluble thermosetting acrylic resin.

In the resulting dispersion, there is dipped a galvanized steel plate (0.5 mm thick) which is connected with an anode of a direct current source, and as the cathode an insoluble metal plate is dipped therein in such a manner that there is 3 cm distance between both electrodes. Electro-deposition is effected by applying 100 volts of direct current at 25°C for 2 minutes. The deposited plate is dried at 95°C for 10 minutes and baked at 250°C for 10 minutes.

The appearance of the coating film and the amount of electro-deposition are shown in Table 8, Column A.

Control Example 8

Using a 5.25 percent (solid concentration) dispersion of polyvinylidene fluoride as in Example 8 but without a water-soluble thermosetting acrylic resin, electro-deposition is effected by applying 100 volts of direct current.

The appearance of the coating film and the amount of electro-deposition are shown in Table 8, Column B.

Table 8

| | Voltage between electrodes (V) | State of deposition film Before baking | After baking | Deposition amount (mg/cm$^2$) |
| --- | --- | --- | --- | --- |
| A | 100 | Hard, runs not produced | Even, no crack, transparent, lustrous | 15.5 |
| B | 100 | Not deposited | — | 0.06 |

EXAMPLE 9

To a 18.2 percent (solid concentration) aqueous dispersion of polyvinylidene fluoride (264 parts), there are added diethylene glycol monobutyl ether (172.8 parts) and dimethyl phthalate (43.2 parts) to give a 10 percent (solid concentration) dispersion of polyvinylidene fluoride. The dispersion (480 parts) admixed with an aqueous solution of a water-soluble acrylic resin "Kogam HW-3" (4.8 parts) to give a dispersion of polyvinylidene fluoride containing a water-soluble acrylic resin.

In the same manner as in Example 1, the electro-deposition is effected using the above dispersion and applying 25 and 50 volts of direct current. The deposited plate is dried at 95°C for 10 minutes and baked at 250°C for 10 minutes.

The appearance of the coating film and the amount of electro-deposition are shown in Table 9, Column A.

Control Example 9

Using a 10 percent (solid concentration) dispersion of polyvinylidene fluoride as in Example 9 but without a water-soluble acrylic resin, electro-deposition is effected by applying 50 and 200 volts of direct current.

The appearance of the coating film and the amount of electro-deposition are shown in Table 9, Column B.

Table 9

| | Voltage between electrodes (V) | State of deposition film Before baking | After baking | Deposition amount (mg/cm$^2$) |
| --- | --- | --- | --- | --- |
| A | 25 | Hard, runs not produced | Even, no crack, transparent, lustrous | 6.60 |
| A | 50 | Hard, runs not produced | Even, no crack, slightly turbid, lustrous | 14.15 |
| B | 50 | Soft, runs produced | Even, no crack, transparent, lustrous | 1.17 |
| B | 200 | Soft, runs produced | Even, no crack, transparent, lustrous | 12.02 |

EXAMPLE 10

A mixture of polyvinylidene fluoride powder (particle size: 0.33 micron) (33.8 parts), titanium oxide "Ti-oxide R—CR$_3$" (manufactured by British Titanium products Co., Ltd.) (14.2 parts) and diethylene glycol monobutyl ether (112 parts) is pulverized in a ball mill for 48 hours to give a 30 percent (solid concentration) dispersion of polyvinylidene fluoride. This dispersion (160 parts) is combined with diethylene glycol monobutyl ether (60.8 parts), dimethyl phthalate (43.2 parts) and a ion exchange resin-treated water (116 parts) to give a 10 percent (solid concentration) dispersion of polyvinylidene fluoride. The dispersion (380 parts) is then admixed with an aqueous solution of a water-soluble thermosetting acrylic resin. "Honnylite H-1000" (6.9 parts) to give a 10 percent (solid concentration) dispersion of polyvinylidene fluoride containing a water-soluble thermosetting acrylic resin.

In the same manner as in Example 7 (1), the electro-deposition is effected using the above prepared dispersion and applying 25 and 50 volts of direct current.

The appearance of the coating film and the amount of electro-deposition are shown in Table 10, Column A.

Control Example 10

Using a 10 percent (solid concentration) dispersion of polyvinylidene fluoride as in Example 10 but without a water-soluble thermosetting acrylic resin, electro-deposition is effected by applying 50, 100 and 200 volts of direct current.

The appearance of the coating film and the amount of electro-deposition are shown in Table 10, Column B.

Table 10

| | Voltage between electrodes (V) | State of deposition film Before baking | After baking | Deposition amount (mg/cm$^2$) |
|---|---|---|---|---|
| A | 25 | Hard, runs not produced | Even, no crack, slightly pale yellow | 6.03 |
|   | 50 | Hard, runs not produced | Even, no crack, slightly pale yellow | 12.45 |
|   | 50 | Soft, runs produced | Even, no crack, slightly pale yellow | 0.78 |
| B | 100 | Soft, runs produced | Even, no crack, slightly pale yellow | 3.30 |
|   | 200 | Soft, runs produced | Even, no crack, pale yellow | 14.10 |

EXAMPLE 11

A mixture of polyvinylidene fluoride powder (particle size: 0.38 micron) (33.8 parts), titanium oxide "Ti-oxide R—CR$_3$" (12.8 parts), carbon black "No. 100" (manufacured by Mitsubishi Chemical Industries Ltd.) (1.4 parts) and diethylene glycol monobutyl ether (112 parts) is pulverized in a ball mill for 48 hours to give a 21 percent (solid concentration) dispersion of polyvinylidene fluoride. This dispersion (160 parts) is combined with diethylene glycol monobutyl ether (69.4 parts) dimethyl phthalate (121 parts) and an ion exchange resin-treated water (116 parts) to give a 7 percent (solid concentration) dispersion of polyvinylidene fluoride. The dispersion (466.4 parts) is a admixed with an aqueous solution of water-soluble thermosetting acrylic resin "Honnylite H–1000" (6.9 parts) to give a 7 percent (solid concentration) dispersion of polyvinylidene fluoride containing a water-soluble thermosetting acrylic resin.

In the same manner as in Example 7 (1), the electro-deposition is effected using the above dispersion and passing 50 volts of direct current.

The appearance of the coating film and the amount of electro-deposition are shown in Table 11, Column A.

Control Example 11

Using a 7 percent (solid concentration) dispersion of polyvinylidene fluoride as in Example 11 but without a water-soluble thermosetting acrylic resin, electro-deposition is effected by applying 50 volts of direct current.

The appearance of the coating film and the amount of electro-deposition are shown in Table 11, Column B.

Table 11

| | Voltage between electrodes (V) | State of deposition film Before baking | After baking | Deposition amount (mg/cm$^2$) |
|---|---|---|---|---|
| A | 50 | Hard, runs not produced | Even, no crack, black | 5.98 |
| B | 50 | Soft, runs produced | Even, no crack, black | 1.28 |

EXAMPLE 12

A mixture of polyvinyl fluoride powder (particle size: 0.41 micron) (48 parts) and diethylene glycol monobutyl ether (72 parts) is pulverized in a ball mill for 12 hours to give a 40 percent (solid concentration) dispersion of polyvinyl fluoride. This dispersion (120 parts) is combined with diethylene glycol monobutyl ether (144 parts) and an ion exchange resin-treated water (216 parts) to give a 10 percent (solid concentration) dispersion of polyvinyl fluoride. The dispersion (480 parts) is then admixed with an aqueous solution of a water-soluble thermosetting acrylic resin "Honnylite H–1000" (6.9 parts) to give a 10 percent (solid concentration) dispersion of polyvinyl fluoride containing a water-soluble thermosetting acrylic resin.

In the same manner as in Example 7 (1), the electro-deposition is effected using the above prepared dispersion and applying 25 and 50 volts of direct current.

The appearance of the coating film and the amount of electro-deposition are shown in Table 12, Column A.

Control Example 12

Using a 10 percent (solid concentration) dispersion of polyvinyl fluoride as in Example 12 but without water-soluble thermosetting acrylic resin, electro-deposition is effected by passing 100 and 200 volts of direct current.

The appearance of the coating film and the amount of electro-deposition are shown in Table 12, Column B.

Table 12

| | Voltage between electrodes (V) | State of deposition film Before baking | After baking | Deposition amount (mg/cm$^2$) |
|---|---|---|---|---|
| A | 25 | Hard, runs not produced | Even, no crack, pale yellowish lustrous | 5.71 |
|   | 50 | Hard, runs not produced | Even, no crack, pale yellowish lustrous | 13.93 |
| B | 100 | Soft, runs produced | Even, no crack, pale yellowish lustrous | 3.41 |
|   | 200 | Soft, runs produced | Even, no crack, pale yellowish lustrous | 11.62 |

EXAMPLE 13

A mixture of polyvinylidene fluoride powder (particle size: 0.37 micron) (24 parts) and diethylene glycol monobutyl ether (36 parts) is pulverized in a ball mill for 18 hours to give a 40 percent (solid concentration) dispersion of polyvinylidene fluoride. This dispersion (60 parts) is combined with diethylene glycol monobutyl ether (155.5 parts), dimethyl phthalate (82.1 parts) and an ion exchange resin-treated water (182.4 parts) to give a 5 percent (solid concentration) dispersion of polyvinylidene fluoride. The dispersion (480 parts) is then admixed with an aqueous solution of a water-soluble thermo-setting acrylic resin "Honnylite H–1000" (8 parts) to give a 5 percent (solid concentration) dispersion of polyvinylidene fluoride containing water-soluble thermosetting acrylic resin.

In the resulting dispersion, there is dipped a steel plate (0.5 mm thick) (the surface being sandblasted and defatted) which is connected with an anode from the direct current source, and as the cathode an insoluble metal plate is dipped therein in such a manner that there is 3 cm distance between both electrodes. Electro-deposition is effected by applying 100 volts of direct current at 25°C for 1 minute. The deposited plate is dried and baked to give an even and transparent coating film of no cracks (25 microns thick).

The thus formed coating film shows good adhesiveness. For instance, it is not peeled off by an impact of 28 inches/pound. After making 100 square notches (1 mm × 1mm) on the coating film, a cellophane tape is adhered thereon and then peeled off whereby no square is eliminated.

EXAMPLE 14

An aluminum plate washed with trichloroethylene and alkali for defatting is oxidized by using 15 percent sulfuric acid and a direct current of $1.4 \times 10^{-2}$ A/cm$^2$ for 30 minutes. The thus oxidized aluminum plate is subjected to electro-deposition using a dispersion of polyvinylidene fluoride containing a water-soluble acrylic resin obtained by Example 5 and by applying 50 volts of direct current. The deposited plate is dried at 95°C for 2 minutes and baked at 250°C for 15 minutes to give an even coating film of no cracks (20 microns thick).

The thus formed coating film shows good adhesiveness. For instance, it is not peeled off by an impact of 28 inches/pound. After making 100 square notches (1 mm × 1 mm) on the coating film, a cellophane tape is adhered thereon and then peeled off whereby no squares are eliminated therefrom.

EXAMPLE 15

In a reactor equipped with an agitator, a thermometer, a gas inlet and a refluxing cooler, acrylamide (10.5 parts), acrylic acid (10 parts), butyl acrylate (50 parts), acrylonitrile (25 parts), paraformaldehyde (purity, 95 percent; 5 parts), dodecyl mercaptan (1.5 parts), ethylene glycol monoethylether (50 parts) and a 0.67 percent aqueous solution of sodium hyposulfite (30 parts) are charged, and the resultant mixture is heated up to 70°C while stirring. A 4 percent aqueous solution of ammonium persulfate (10 parts) is added dropwise thereto in 30 minutes. then, the Then, is mildly refluxed for 3 hours. After the polymerization is completed (conversion, about 96 percent), the temperature is lowered below 40°C. The reaction mixture is neutralized with 28 percent aqueous ammonia (12 parts), and water is added to make a solid concentration of 35 percent. The thus prepared water-soluble thermosetting acrylic resin solution (6.9 parts) is admixed with a 10 percent (solid concentration) dispersion of polyvinylidene fluoride without a water-soluble thermosetting acrylic resin as obtained in Example 7 (1) (430 parts) to give a dispersion of polyvinylidene fluoride containing a water-soluble thermosetting acrylic resin.

In the same manner as in Example 1, the electro-deposition is effected using the above dispersion and by applying 25 volts of direct current. The deposited plate is dried at 90°C for 10 minutes and baked at 250°C for 10 minutes.

The appearance of the coating film and the amount of electro-deposition are shown in Table 13.

EXAMPLE 16

In a reactor, dioxane (67.5 parts) is charged and heated to the refluxing temperature. A mixture of ethyl acrylate (375 parts), acrylic acid (107.5 parts) and a 1 percent solution of ethyl acrylate in butyl mercaptan (122 parts) is added portionwise thereto simultaneously with the portionwise addition of cumene hydroperoxide (12.2 parts). Then, the mixture is refluxed for about 5 hours. After the polymerization is completed, the temperature is lowered below 40°C. The produced polymer (200 parts) is dissolved in a mixture of 29 percent aqueous ammonia and water (1 : 4 by weight; 220 parts), and water is added to make a solid concentration of 35 percent. The thus prepared water-soluble acrylic resin solution (6.9 parts) is admixed with a 10 percent (solid concentration) dispersion of polyvinylidene fluoride without a water-soluble thermosetting acrylic resin as obtained in Example 7 (1) (480 parts) to give a dispersion of polyvinylidene fluoride containing a water-soluble acrylic resin.

In the same manner as in Example 1, the electro-deposition is effected using the above dispersion and by applying 25 volts of direct current. The deposited plate is dried at 90°C for 10 minutes and baked at 250°C for 10 minutes.

The appearance of the coating film and the amount of electro-deposition are shown in Table 13.

EXAMPLE 17

Linseed oil fatty acid of about 190 in acid value (80 parts), tall oil fatty acid (8 parts) of about 190 in acid value and pentaerythritol (100 parts) are heated at 180° to 230°C while stirring until the acid value reaches around 5. After the addition of phthalic anhydride (100 parts), the resultant mixture is heated at 200°C until the acid value reaches around 62. The reaction product (100 parts) is dissolved in a mixture of triethylamine and water (1 : 4 by weight; 40 parts), and water is added thereto to make a solid concentration of 35 percent. The thus prepared water-soluble alkyd resin solution (6.9 parts) is admixed with a 10 percent (solid concentration) dispersion of polyvinylidene fluoride without a water-soluble thermosetting acrylic resin as obtained in Example 7 (1) (480 parts) to give a dispersion of polyvinylidene fluoride containing a water-soluble alkyd resin.

In the same manner as in Example 1, the electro-deposition is effected using the above dispersion and by applying 25 volts of direct current. The deposited plate is dried at 90°C for 10 minutes and baked at 250°C for 10 minutes.

The appearance of the coating film and the amount of electro-deposition are shown in Table 13.

EXAMPLE 18

Linseed oil (450 parts) and maleic anhydride (50 parts) are heated at 200°C for 1 hour. After the temperature is elevated to 230°C in 1 hour, the mixture is maintained at such temperature for 2 hours whereby the acid value reaches around 110. To the resulting mixture, ethylene glycol (16 parts) and glycerol (22 parts) are added, and the temperature is raised to 180° to 190°C and the mixture is maintained at such temperature until the acid value reaches around 60. The produced resin (200 parts) is dissolved in a mixture of dimethylaminoethanol and water (1 : 4 by weight; 95.2 parts), and water is added thereto to make a solid concentration of 35 percent. The thus prepared water-soluble alkyd resin solution (6.9 parts) is admixed with a 10 percent (solid concentration) dispersion of polyvinylidene fluoride without a water-soluble thermosetting acrylic resin as obtained in Example 7 (1) (480 parts) to give a dispersion of polyvinylidene fluoride containing water-soluble alkyd resin.

In the same manner as in Example 1, the electro-deposition is effected using the above dispersion and by applying 25 volts of direct current. The deposited plate is dried at 90°C for 10 minutes and baked at 250°C for 10 minutes.

The appearance of the coating film and the amount of electro-deposition are shown in Table 13.

EXAMPLE 19

In a reactor, trimellitic acid (415 parts), propylene glycol (388 parts) and adipic acid (105 parts) are charged, and the resulting mixture is heated at 177°C in an inert gas until the acid value reaches 60 to 70. After the addition of tall oil fatty acid (404 parts), heating is continued until the acid value reaches 50 to 55. The reaction product (100 parts) is cooled below 40°C, and isobutanol (20 parts) and triethylamine (12 parts) are added thereto in that order. The resulting mixture is admixed with water to make a solid concentration of 35 percent. The thus prepared water-soluble alkyd resin (6.9 parts) is combined with a 10 percent (solid concentration) dispersion of polyvinylidene fluoride without a water-soluble thermosetting acrylic resin as obtained in Example 7 (1) (480 parts) to give a dispersion of polyvinylidene fluoride containing a water-soluble alkyd resin.

In the same manner as in Example 1, the electro-deposition is effected using the above dispersion and by applying 25 volts of direct current. The deposited plate is dried at 90°C for 10 minutes and baked at 250°C for 10 minutes.

The appearance of the coating film and the amount of electro-deposition are shown in Table 13.

EXAMPLE 20

In a reactor, methacrylamide (25 parts), methacrylic acid (7 parts), styrene (5 parts) and ethyl acrylate (54 parts) are charged and isopropanol (65 parts), t-butanol (10 parts) and paraformaldehyde (purity, 95 percent; 10 parts) are added thereto in that order. After the addition of a 4 percent aqueous solution of sodium hyposulfite (5 parts), the resultant mixture is heated at 50°C while stirring. A 2 percent aqueous solution of ammonium persulfate (20 parts) is further added thereto, and the resulting mixture is heated at 50°C for 4 hours. Then, the temperature is lowered, and the reaction mixture is neutralized with 28 percent aqueous ammonia (5.5 parts). Water is added to the mixture to make a solid concentration of 35 percent. The thus prepared water-soluble acrylic resin solution (6.9 parts) is admixed with a 10 percent (solid concentration) dispersion of polyvinylidene fluoride without a water-soluble thermosetting acrylic resin as obtained in Example 7 (1) (480 parts) to give a dispersion of polyvinylidene fluoride containing a water-soluble acrylic resin.

In the same manner as in Example 1, the electro-deposition is effected using the above dispersion and by applying 25 volts of direct current. The deposited plate is dried at 90°C for 10 minutes and baked at 250°C for 10 minutes.

The appearance of the coating film and the amount of electro-deposition are shown in Table 13.

EXAMPLE 21

In a reactor, epoxy resin "Epicoat 1001" (manufactured by Shell Oil Co., Ltd.) (130 parts), dehydrated castor oil fatty acid (84 parts), rosin (34 parts) and hemp seed oil fatty acid (60 parts) are charged, and xylene (20 parts) is added thereto. The resulting mixture is heated at 180° to 190°C, during which the water in the reaction system is removed. Then, the resultant mixture is heated at 210°C for 1 hour. The reaction mixture (100 parts) is dissolved in butanol (20 parts) and neutralized with 28 percent aqueous ammonia (11 parts). Water is added to the resulting mixture to make a solid concentration of 35 percent. The thus prepared water-soluble epoxy resin solution (6.9 parts) is admixed with a 10 percent (solid concentration) dispersion of polyvinylidene fluoride without a water-soluble thermosetting acrylic resin as obtained in Example 7 (1) (480 parts) to give a dispersion of polyvinylidene fluoride containing water-soluble epoxy resin.

In the same manner as in Example 1, the electro-deposition is effected using the above dispersion and by applying 25 volts of direct current. The deposited plate is dried at 90°C for 10 minutes and baked at 250°C for 10 minutes.

The appearance of the coating film and the amount of electro-deposition are shown in Table 13.

Table 13

| Example No. | Voltage between electrodes (V) | State of deposition Before baking | State of deposition After baking | Deposition amount (mg/cm$^2$) |
|---|---|---|---|---|
| 15 | 25 | Hard, runs not produced | Even, no crack, transparent, lustrous | 4.18 |
| 16 | 25 | Hard, runs not produced | Even, no crack, transparent, lustrous | 4.25 |
| 17 | 25 | Hard, runs not produced | Even, no crack, transparent, lustrous | 3.97 |
| 18 | 25 | Hard, runs not produced | Even, no crack, transparent, lustrous | 4.00 |
| 19 | 25 | Hard, runs not produced | Even, no crack, transparent, lustrous | 4.07 |
| 20 | 25 | Hard, runs not produced | Even no crack, transparent, lustrous | 4.15 |
| 21 | 25 | Hard, runs not produced | Even, no crack, transparent, lustrous | 4.02 |

All the water-soluble resins as referred to in the foregoing Examples and Control Examples are now on the market and readily available. The compositions of those water-soluble resins can be assumed as shown in the following Table on the basis of the comparison of their infrared absorption spectra with those described in Atlas der Kunststoff Analyse:

Table

| Tradename | Atlas No. | Composition | Remarks |
|---|---|---|---|
| Honnylite H-1000 | 925 | Mixture of polyacrylate and melamine resin | Assumed to be methylol acrylamide + acrylic ester + water-soluble melamine resin |
| Kogam HW-3 | 911 | Potassium salt of n-butyl acrylate -acrylic acid (9:1) copolymer | Similar as a whole and different partly. |
| Kogam HW-12 | 899 | Ethyl acrylate-acrylamide copolymer | Assumed to be a mixture of water-solubilized methyl acrylate or butyl acrylate or methyl methacrylate + acrylamide + acrylonitrile. |
| Aron S-4002 | 907 | Water-soluble acrylic resin containing butyl acrylate, styrene and amide components | Quite similar to the one of Atlas No. 907 excluding styrene therefrom. Assumed to be butyl acrylate + acrylamide. |
| Haridip BK-34 | 722 | Alkyd resin constituted with pyromellitic acid, phthalic acid, adipic acid and propylene glycol | Different about an absorption at 12 to 13 microns. |
| Haridip BK-36 | 808 | Alkyd resin constituted mainly with trimellitic acid and neopentyl glycol | Assumed to be resin constituted with trimellitic acid, isophthalic acid, polyvalent alcohol and fatty acid. |
| Milbenresin 301 | 914 | Polyacrylamide | Entirely same as the one of Atlas No. 914 |
| Yodosol 3505 | 914 | Aqueous dispersion of butyl acrylate-vinyl acetate copolymer | Entirely same as the one of Atlas No. 914 |

What is claimed is:

1. A coating composition for electro-deposition which comprises 1–30 percent by weight of a powder of a vinylidene fluoride polymer or a vinyl fluoride polymer containing not less than 75 percent pecent by weight of vinylidene fluoride or vinyl fluoride monomer units, said powder having a particle size of 0.1 to 100 microns, a mixture of a water-soluble organic solvent system capable of forming a film of the said polymer and water wherein the ratio of the organic solvent to water is from 20 : 80 to 90 : 10 by weight and a water-soluble resin, which resin dissociates and is ionized in water and is selected from the group consisting of an acrylic acid resin, an alkyd resin and an acrylic amide resin, said resin being used in an amount of 0.1 to 30 percent by weight of the said polymer.

2. The coating composition according to claim 1, wherein the polymer is present in the form of dispersion.

3. The coating composition according to claim 1, wherein the polymer is a homopolymer of vinylidene fluoride or a copolymer of vinylidene fluoride with another polymerizable monomer which copolymer is composed of not less than 75 percent by weight of vinylidene fluoride units.

4. The coating composition according to claim 1, wherein the polymer is polyvinylidene fluoride.

5. The coating composition according to claim 1, wherein the organic solvent system is one which can dissolve the polymer at room temperature or at a temperature lower than its boiling point and is composed of a sole organic solvent.

6. The coating composition according to claim 1, wherein the organic solvent system is one which can dissolve the polymer at room temperature or at a temperature lower than its boiling point and is composed of a mixture of at least one of solvents which can not be used alone with at least one of solvent which can be used alone.

7. The coating composition according to claim 1, wherein the organic solvent system is one which can dissolve the polymer at room temperature or at a temperature lower than its boiling point and is composed of a mixture of at least one solvent which can not be used alone with at least one solvent which is soluble in water and does not dissolve the polymer.

8. The coating composition according to claim 1, wherein the organic solvent system is a sole organic solvent selected from the group consisting of dimethylformamide, diethylformamide, dimethylacetamide, 2-pyrrolidone, N-methyl-2-pyrrolidone, γ-butyrolactone, ethylene glycol monobutylether, diethylene glycol monomethylether, diethylene glycol monoethylether, diethylene glycol diethylether, diethylene glycol monoethylether acetate, diethylene glycol monobutylether and triethylene glycol monomethylether.

9. The coating composition according to claim 1, wherein the organic solvent system is composed of a mixture of an organic solvent selected from the group consisting of dimethylformamide, diethylformamide, dimethylacetamide, 2-pyrrolidone, N-methyl-2-pyrrolidone, γ-butyrolactone, ethylene glycol monobutylether, diethylene glycol monomethylether, diethylene glycol monoethylether, diethylene glycol diethylether, diethylene glycol monoethylether acetate, diethylene glycol monobutylether and triethylene glycol monomethylether and a solvent selected from the group consisting of dimethyl adipate, dioctyl adipate, dimethyl sabacate, isophorone, dimethyl phthalate, diethyl phthalate, dibutyl phthalate, quinoline, ethylene glycol monophenylether, ethylene glycol monophenylether acetate, diethylene glycol monobutylether acetate, diethylene glycol dibutyl ether and propylene glycol monobutylether.

10. The coating composition according to claim 1, wherein the water-soluble resin is a high molecular weight resin selected from the group consisting of a water-soluble acrylic acid resin, a water-soluble alkyd resin, and a water-soluble acrylic amide resin and the organic solvent system is a sole organic solvent selected from the group consisting of dimethylformamide, diethylformamide, dimethylacetamide, 2-pyrrolidone, N-methyl-2-pyrrolidone, γ-butyrolactone, ethylene glycol monobutylether, diethylene glycol monomethylether, diethylene glycol monoethylether, diethylene glycol diethylether, diethylene glycol monoethylether acetate, diethylene glycol monobutylether and triethylene glycol monomethylether.

11. A coating composition according to claim 1, wherein the water-soluble resin is an acrylic acid resin.

12. A coating composition according to claim 1, wherein the water-soluble resin is an alkyd resin.

13. A coating composition according to claim 1, wherein the water-soluble resin is an acrylic amide resin.

* * * * *